United States Patent [19]

Sasaki et al.

[11] Patent Number: 5,705,551
[45] Date of Patent: *Jan. 6, 1998

[54] ELASTOMERIC PRESSURE-SENSITIVE ADHESIVE COMPOSITIONS EXHIBITING GOOD CUTTING PERFORMANCE

[75] Inventors: Yukihiko Sasaki, Claremont; Jesse C. Ercillo, Covina, both of Calif.

[73] Assignee: Avery Dennison Corporation, Pasadena, Calif.

[*] Notice: The term of this patent shall not extend beyond the expiration date of Pat. No. 5,322,876.

[21] Appl. No.: 262,751

[22] Filed: Jun. 20, 1994

Related U.S. Application Data

[63] Continuation of Ser. No. 986,854, Dec. 4, 1992, Pat. No. 5,322,876, which is a continuation-in-part of Ser. No. 802,881, Dec. 6, 1991, abandoned.

[51] Int. Cl.[6] .................. C08K 5/06; C08K 9/06

[52] U.S. Cl. .................. 524/366; 524/376; 524/377; 524/271; 525/89; 525/90; 428/355

[58] Field of Search .................. 524/366, 376, 524/377, 271; 525/89, 90; 428/355

[56] References Cited

U.S. PATENT DOCUMENTS

| | | | |
|---|---|---|---|
| 3,932,328 | 1/1976 | Korpman | 428/355 |
| 4,125,665 | 11/1978 | Bemmels et al. | 428/355 |
| 4,379,095 | 4/1983 | Oldack | 524/376 |
| 5,290,842 | 3/1994 | Sasaki et al. | 525/89 |

Primary Examiner—Paul R. Michl
Assistant Examiner—Olga Asinovsky
Attorney, Agent, or Firm—Christie, Parker & Hale, LLP

[57] ABSTRACT

The cuttability of elastomeric pressure-sensitive adhesives, particularly of hot-melt tackified mutually immiscible elastomers, is improved by the addition of surfactants containing polyethylene-oxide and polypropylene-oxide blocks.

25 Claims, 7 Drawing Sheets

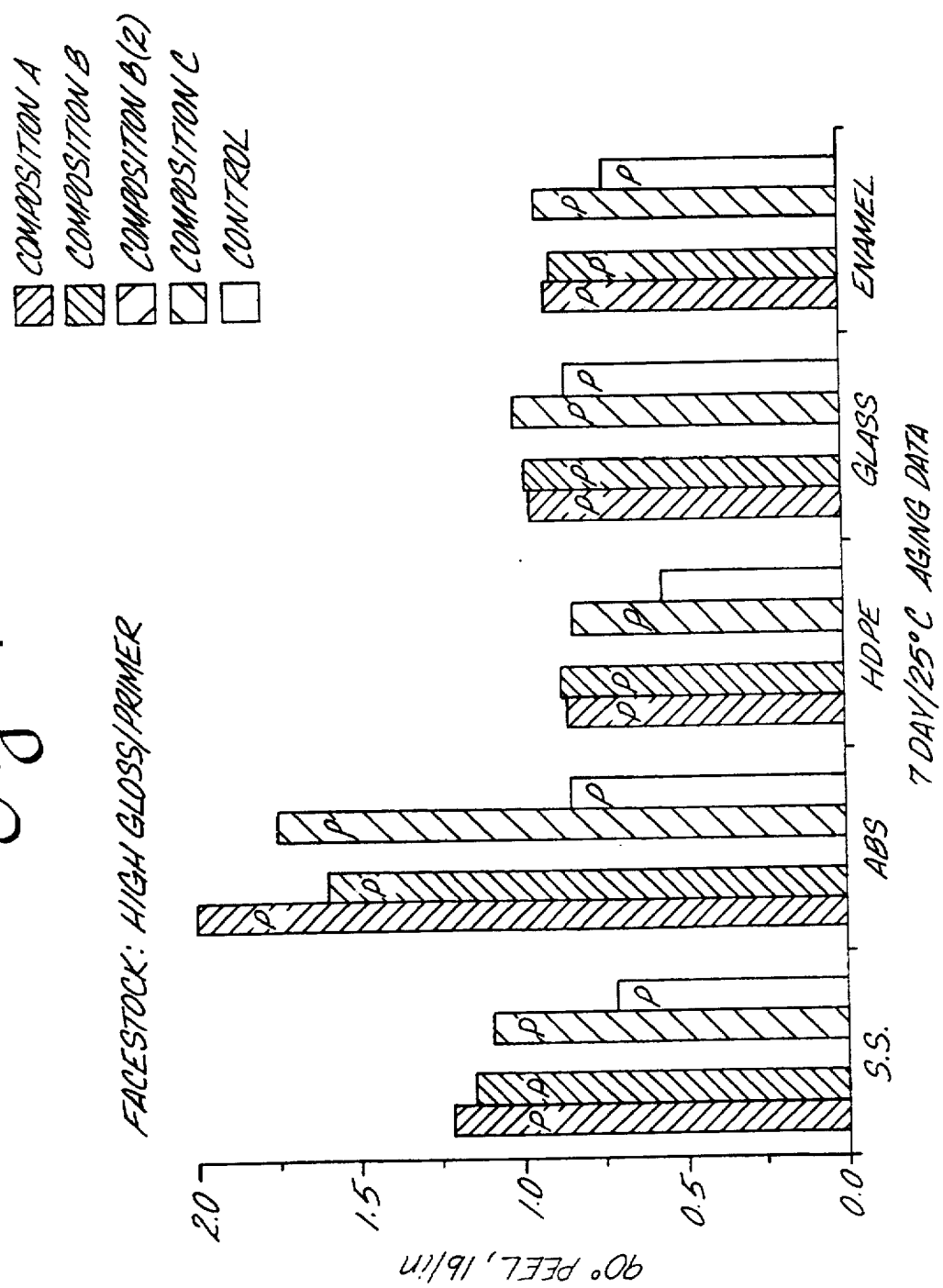

ELASTOMERIC PRESSURE-SENSITIVE ADHESIVE COMPOSITIONS EXHIBITING GOOD CUTTING PERFORMANCE

CROSS-REFERENCE TO RELATED APPLICATION

This is a continuation of application Ser. No. 07/986,854 filed Dec. 4, 1992 now U.S. Pat. No. 5,322,876, which is a continuation-in-part of application Ser. No. 07/802,881 filed Dec. 6, 1991, abandoned.

FIELD OF THE INVENTION

The present invention is directed to elastomeric rubber based pressure-sensitive adhesive compositions used in label and tape manufacture where the adhesive employed has improved cuttability and therefore convertability.

BACKGROUND OF THE INVENTION

During the process of converting pressure-sensitive bulk products such as rolls of a laminate of a face stock or backing, a pressure-sensitive adhesive layer, and a release liner into end products, many cutting operations are performed. These include slitting, sheeting, guillotining including hole punching and perforating, and die cutting on rotary and flat-bed machines.

Die cutting for label manufacture is the most complex. There, a laminate of a face stock or backing, pressure-sensitive adhesive layer and a release liner is passed through apparatus which converts the laminate to yield commercially useful labels from label stock. The processes involved in converting operations include printing, die cutting and matrix stripping to leave labels on a release liner, butt cutting of labels to the release liner, marginal hole punching, perforating, fan folding, guillotining and the like.

Die and butt cutting involve cutting of the laminate to the face of the release liner. Other procedures involve cutting clean through the label laminate and include hole punching, perforating and guillotining.

The cost of converting a laminate into a finished product is a function of the speed at which the various processing operations occur. While the nature of all layers of the laminate can impact cost of convertability, the adhesive layer has been the greatest limiting factor in ease and cost of convertability. This is in consequence of its viscoelastic nature which hampers precise and clean penetration of a die in die cutting operations and promotes adherence of the adhesive to cutting blades and the like in converting operations.

For slitting and sheeting, the cutting blade, because of adhesive adherence, becomes tacky and forms so called "gum balls." The gum balls transfer to the surface of paper and produce product defects. Quite often, the operators have to stop the cutting operation and clean the blade. Placing a lubricant such as mineral oil on the surface of the blade can help the cutting process.

For die cutting, poor cutting causes matrix breaks when waste matrix is peeled off. In order to avoid the matrix breaks, the press operators are forced to lower the converting speed.

For guillotining where stacks of sheets are cut at the same time, the cutting edge of the paper tends to become tacky. As a result the separation of each sheet becomes difficult and subsequent printing process may be jammed.

In order to improve the converting process, minimization of adhesive adherence to cutting blades is most important. U.S. Pat. No. 4,151,319 to Sackoff et. al and U.S. Pat. No. 4,346,189 to Laurent claim addition of silicone oil and gums to adhesive compositions. These additives improve cutting performance, but at a sacrifice in adhesion.

While not directly related to cutting performance, U.S. Pat. No. 4,693,935 to Mazurek discloses polysiloxane-grafted adhesive copolymers. The adhesive compositions claimed are repositionable with adhesive-bonding building upon dwell for an extended time.

U.S. Pat. No. 4,548,845 to Parsons et. al teaches the addition of a polyoxyalkylene polyol such as polyethylene glycol to tackified water-insoluble adhesives to reduce the adhesive build-up on a knife blade during guillotine cutting. This has resulted in phase separation and incompatibility in some adhesive systems.

SUMMARY OF THE INVENTION

According to the invention, cutting performance of pressure-sensitive adhesive compositions is improved by the addition of block copolymers with hydrophilic and hydrophobic blocks with the following structures being preferred:

| | |
|---|---|
| PEO—PPO—PEO | (1) |
| PPO—PEO—PPO | (2) |
| (PEO—PPO—)$_4$ | (3) |
| (PPO—PEO—)$_4$ | (4) | where PEO is a hydrophilic polyethylene-oxide block and PPO is a hydrophobic polypropylene-oxide block. The inclusion of a compatible wax in an amount up to 15% by weight of the total composition and can be effective to improve guillotinability or cuttability. The presently preferred wax is a polyethylene glycol wax, specifically Carbowax™ 1450.

The surfactants may be employed in a concentration of from about 1% to about 15% by weight of the resin, and preferably have an HLB (hydrophilic-lipophilic balance) value in excess of 7, preferably from 12 to greater than 24. To our surprise, addition of these surfactants to hot melt compositions not only improves cutting performance of adhesive laminates, but also three major advantages over the prior art were found.

When polyethylene glycol and polysiloxanes are added to adhesive composition, adhesive performance goes down considerably, especially peel adhesion and tack. Addition of surfactants lower the adhesive performance to a significant lesser extent.

Moreover, polysiloxanes and polyethylene glycol are both incompatible with rubber-based adhesives. Although they can be used when solvent coating is employed, in hot-melt compositions incompatibility of these materials caused a problem due to phase separation.

Due to the hydrophobic nature of the polypropylene-oxide block, these surfactants are compatible with rubber-based adhesives and are easy to handle; phase separation is not a problem. These surfactants can therefore be utilized for water-based as well as solvent-based adhesives in addition to use in hot melt adhesives.

The pressure-sensitive adhesive is preferably coated onto a silicone-coated release paper, and any additive added to the pressure-sensitive adhesive (PSA) preferably should not adversely affect the release characteristics. When the surfactant (Pluronic F-108) was added to a hot melt formulation, release characteristics were not affected greatly at all speed ranges tested (up to 300 m/min). (See Table 2 below for description of Pluronic F-108.) When polyethylene-glycol is added to a similar adhesive composition, high speed release became adversely affected and became harder to release. One of the converting process includes label making process where rotary die cutting and matrix stripping is quite often the rate determining process. The matrix stripping requires good release characteristics over a wide range of speeds and is especially important at high speeds. If the release is too tight the matrix breaks and converting speed suffers. Even if cutting performance is improved, this may not overcome matrix stripping difficulties. When conversion was tested on a high-speed Mark Andy Press compositions containing polyethylene glycol showed convertability worse than adhesive without additives, while Pluronic F-108 addition increased converting speed markedly.

The elastomeric or rubber-based pressure-sensitive adhesive is preferably based on a combination of two or more immiscible elastomers which, when combined in proper proportion, provide at least two glass transition temperatures, and by the addition of one or more tackifiers. Addition of one or more of the tackifiers produces an increase in the difference between the two glass transition temperatures as a consequence of preferential miscibility of the tackifier in the elastomer having the highest glass transition temperature and an amplification of tangent delta of the elastomer having the higher glass transition temperature. Although explained in terms of diene elastomers, the invention is contemplated to be applicable to immiscible tackifiable and internally tackified polymers including, but not limited to, acrylic ester based polymers and the like.

The surfactant additive may have utility with rubber-based and acrylic-based adhesives having a single glass transition temperature.

In a preferred aspect, the invention is based on an admixture of a first elastomer providing a first polymerized diene, preferably polybutadiene, and exhibiting a first glass transition temperature and a second natural or synthetic elastomer providing a second polymerized diene component, preferably polyisoprene, and having a second glass transition temperature higher than the first. The elastomers are mixed in proportion to exhibit a dynamic mechanical spectrum (DMS), i.e., a plot of a tangent delta (the ratio of G" to G' as defined herein) against temperature, with at least two, as opposed to one, distinct peaks corresponding to glass transition temperatures of the first polymerized diene (polybutadiene) and second polymerized diene (polyisoprene) components of the immiscible blend. A tackifying system comprising at least one solid tackifier is added to increase the glass transition temperature of at least the second peak in order to increase the temperature differential between the peaks, while increasing the amplitude (tangent delta) of the second (polyisoprene) peak. Shifting at least the second peak toward ambient temperature improves ambient temperature pressure-sensitive adhesive performance. The maintenance of the first peak assures low temperature pressure-sensitive adhesive performance. Low values of tangent delta give good processability and cuttability.

The immiscible rubbers are provided in proportion of the polybutadiene containing elastomer to the polyisoprene containing elastomer from about 0.5:1 to about 5:1 and comprise from about 20% to about 50% by weight of the total weight of the mixture of elastomers and tackifying additive.

The tackifying system is preferentially soluble in the polyisoprene component and comprises a normally solid tackifying resin, preferably based on polymerized structures derived from aliphatic dishes and mono-olefins containing 5 or 6 carbon atoms, preferably with at least 40% of the structures derived from piperylene or from piperylene and isoprene, aromatic resins which are hydrogenated to the degree that substantially all of the benzene rings are converted to cyclohexane rings, and hydrogenated polycyclic resins such as hydrogenated dicyclopentadiene resins. The additive system preferably includes a normally liquid tackifying resin which is preferentially soluble in the polyisoprene component. Other constituents of the tackifying system may include rosin, rosin ester and polyterpenes which are at least partially compatible with the polyisoprene component, and plasticizing oils. The additives do not, however, limit the function of the tackifiers, namely, increasing the glass transition temperature differential between the peaks.

Presently preferred compositions are those in which the ratio of the polybutadiene-based elastomer to the polyisoprene-based elastomer is about 1.3:1 and present in about 15% to about 30% by weight based on the total composition, the balance of the composition, except for inhibitors, antioxidants and other modifiers, are tackifiers.

The invention is also useful in improving cutting performance of natural rubber (polyisoprene) based adhesives as well as styrene-isoprene and styrene butadiene di and tri-block copolymers.

THE DRAWINGS

FIGS. 1 to 7 are block diagrams illustrating 90° peel in pounds per inch to various substrates of the composition identified in Table 8 and are based on the date reported in Tables 9 and 10. The face stocks or backing were satin litho, high gloss paper and primed high gloss paper. In the FIGURE, "p" means panel failure, "ps" means panel stain and "F" means face stock failure.

DETAILED DESCRIPTION

Figure 1:
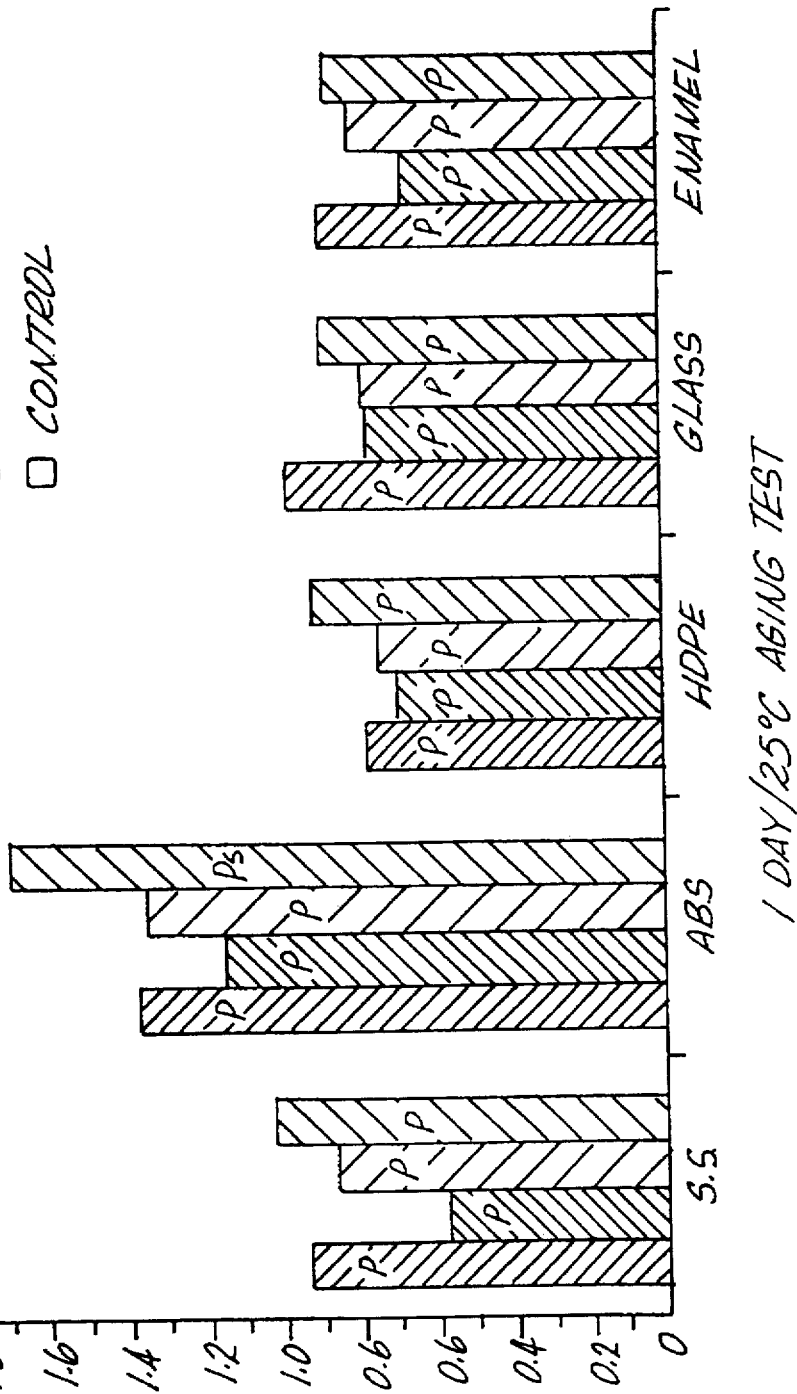
Figure 2:
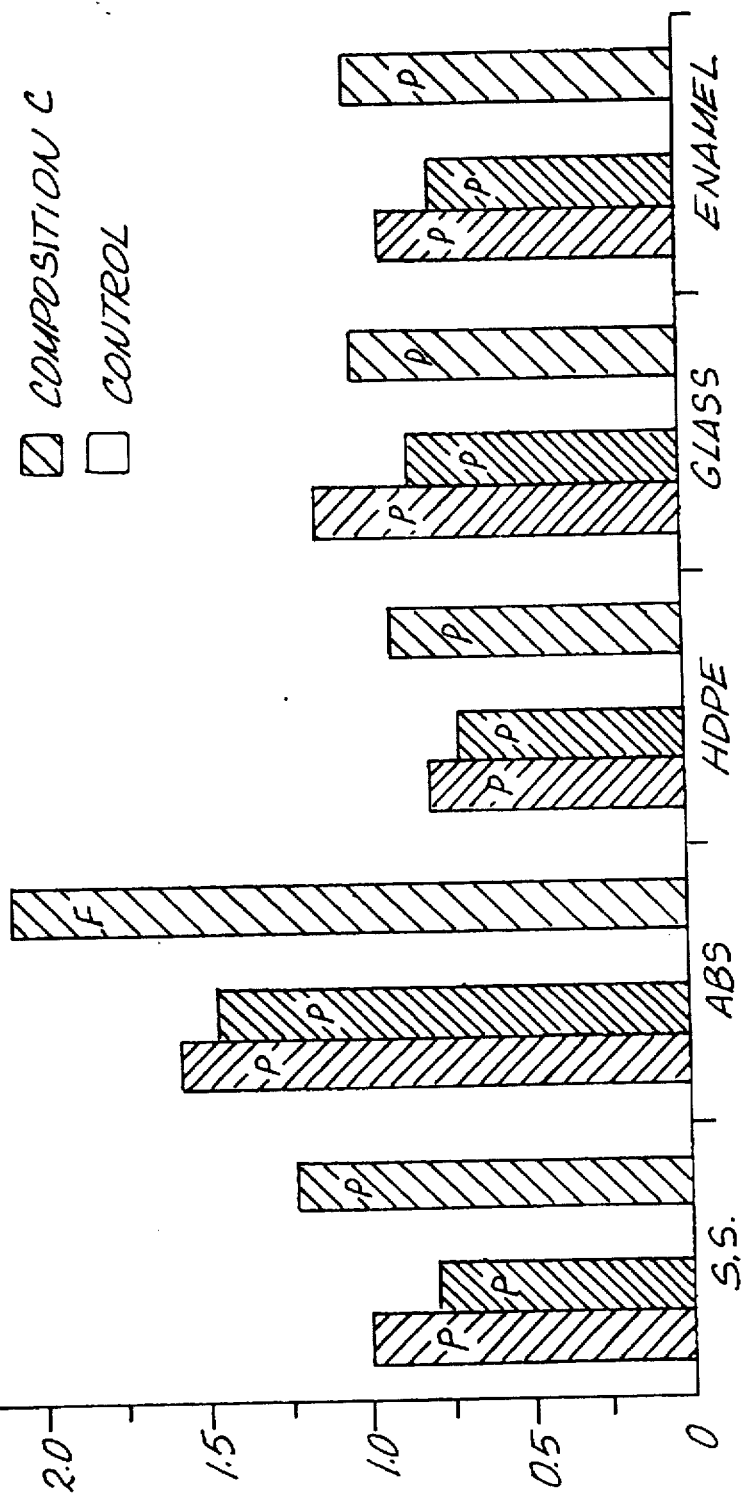
Figure 3:
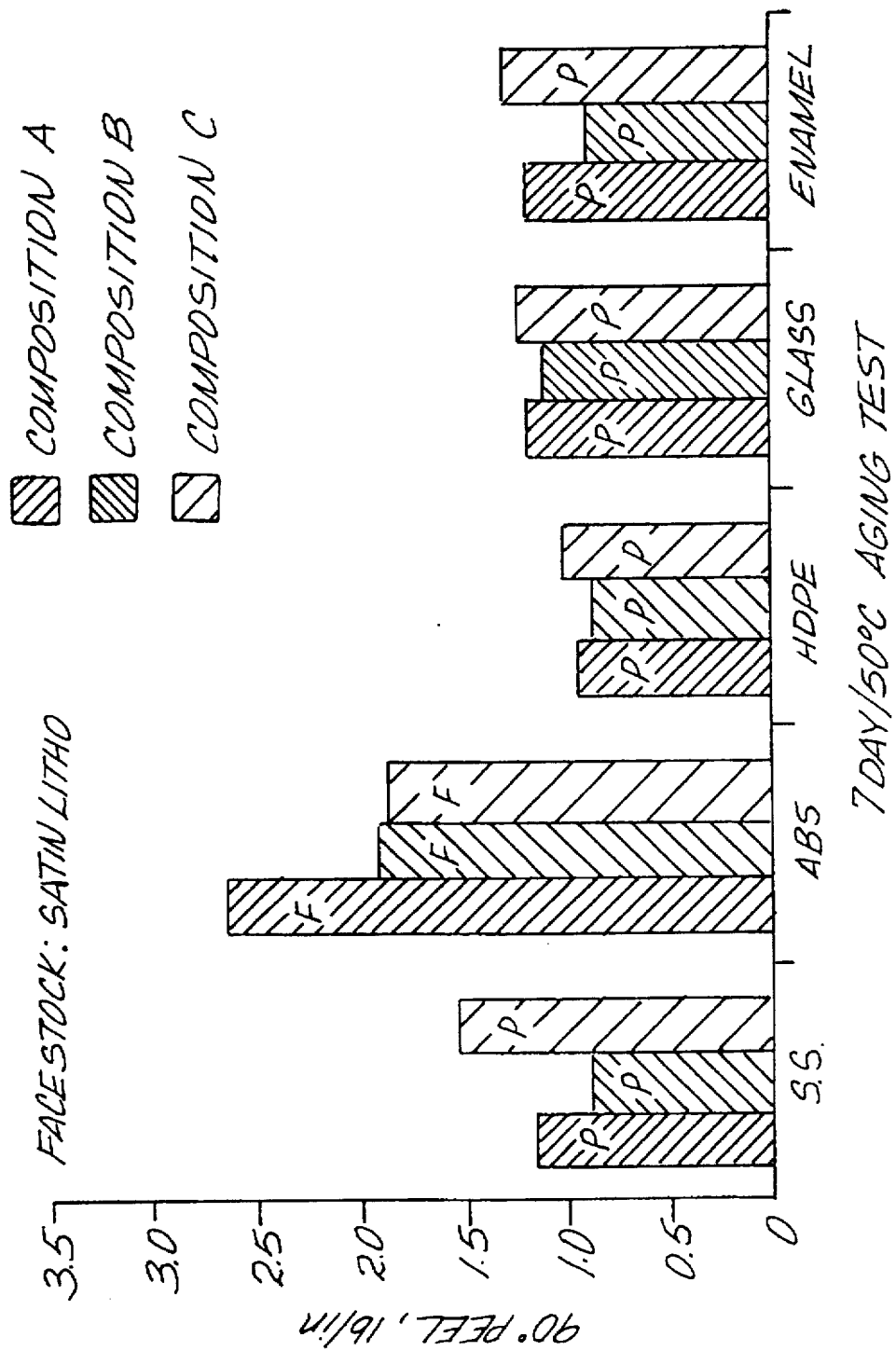
Figure 4:
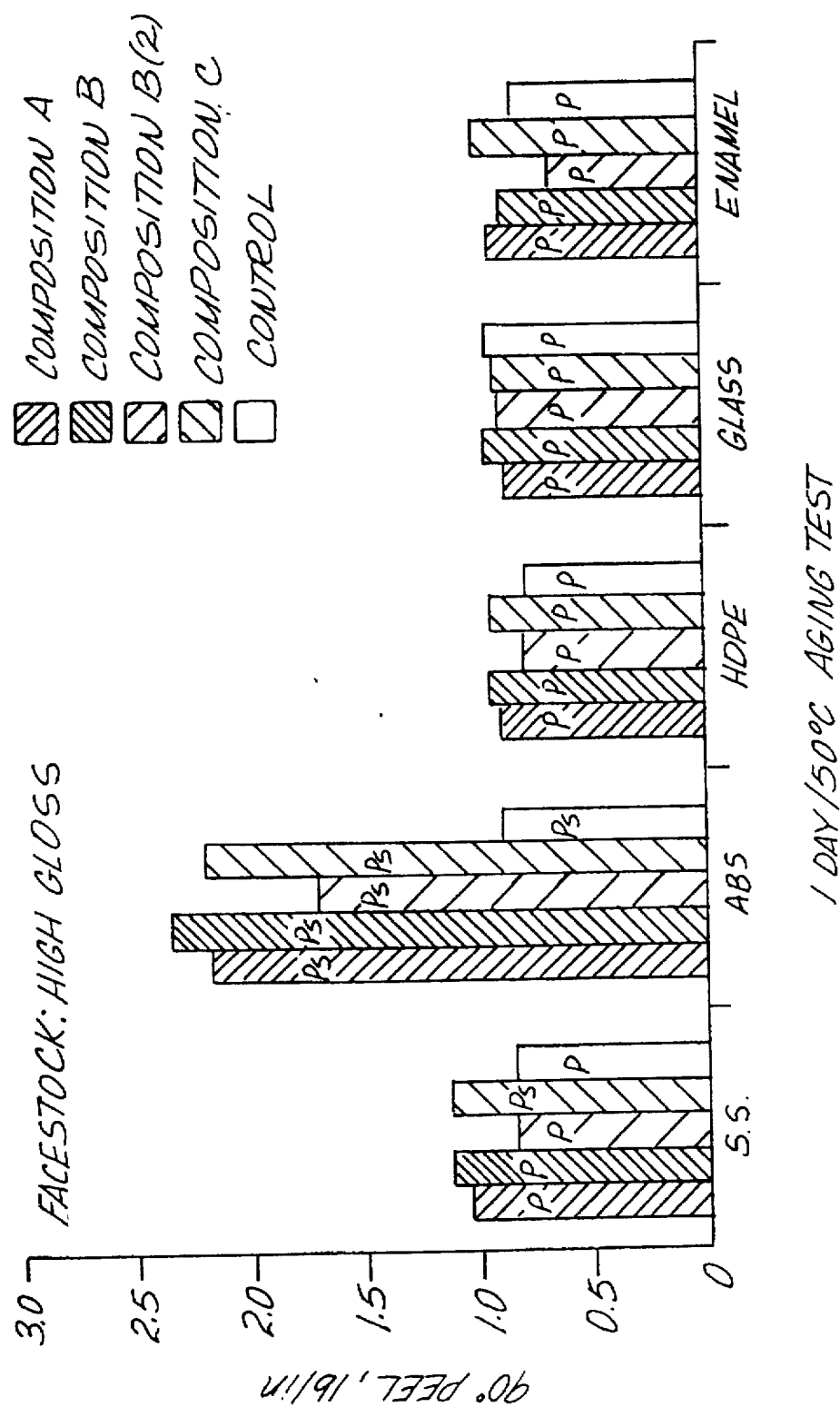
Figure 5:
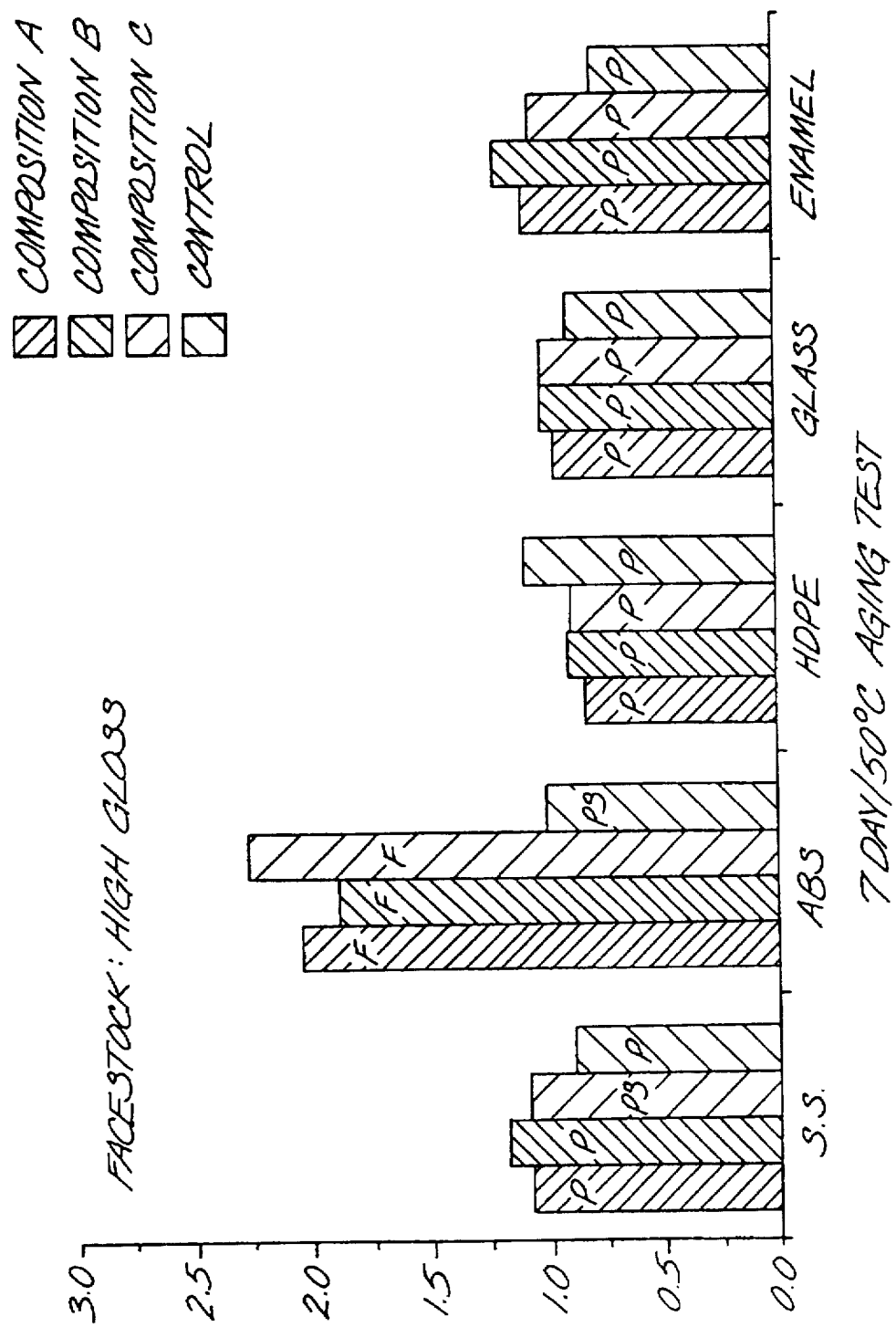
Figure 6:
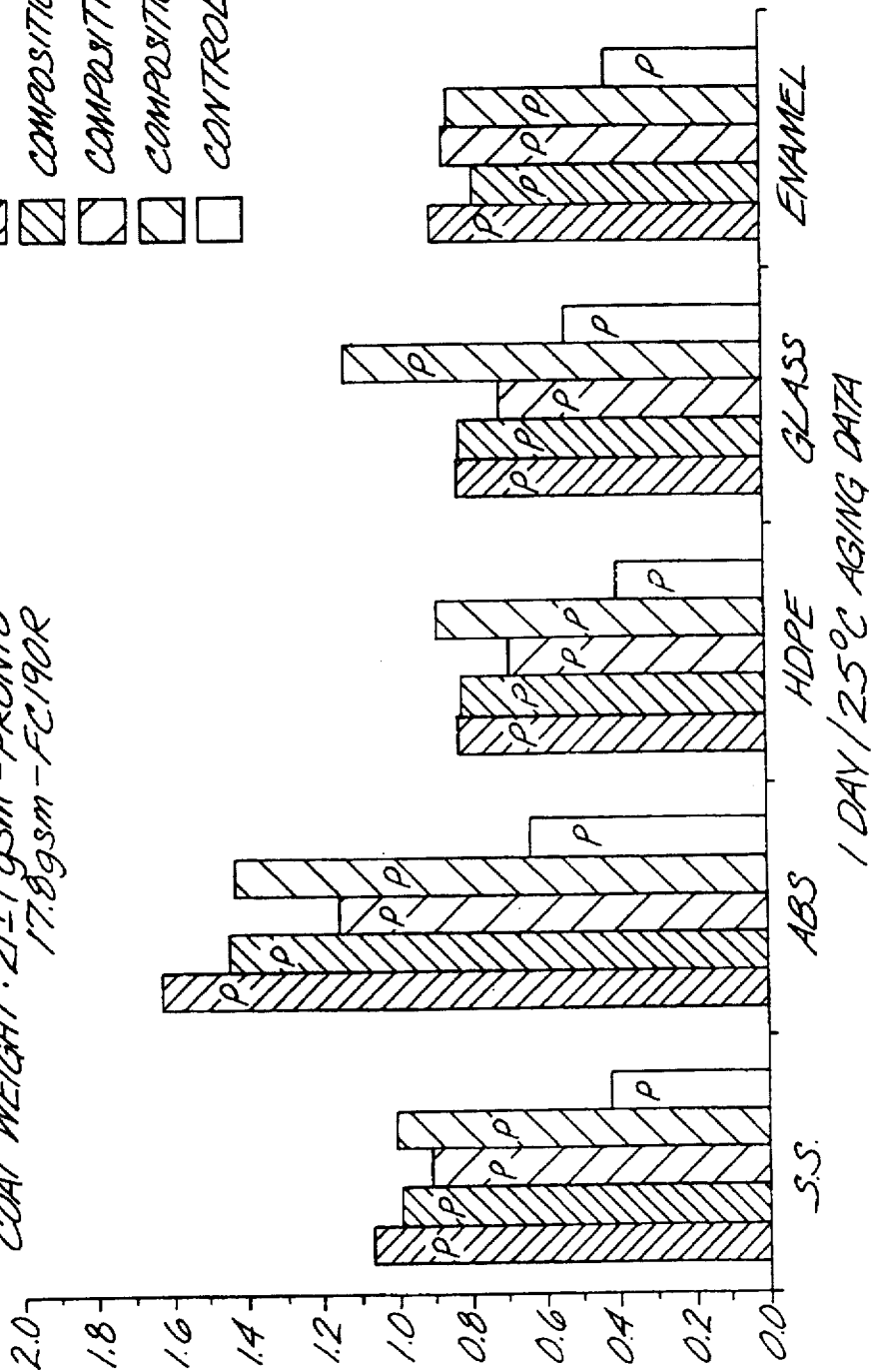

The present invention is directed to improving the cuttability of elastomeric pressure-sensitive adhesives, especially adhesives based on polymers of butadiene and isoprene, preferably mixtures of two immiscible natural or synthetic elastomers, one based on a first polydiene, preferably polybutadiene or one containing polybutadiene blocks, exhibiting a first glass transition temperature and a value of tangent delta and the other based on a second polydiene, preferably polyisoprene or one containing polyisoprene blocks exhibiting a second glass transition temperature higher than the first and a second value of tangent delta associated therewith. The two elastomers are combined in proportion whereby there is exhibited two distinct glass transition temperature peaks in a DMS curve, a plot of tangent delta as a function of temperature in °C. There is provided to the composition a tackifying system which comprises tackifiers preferentially soluble in the second polydiene component which cause the temperature differential between the glass transition temperature peaks in the DMS curve to increase and the amplitude of the tangent delta for the second glass transition temperature to also increase. The net result is to provide a pressure-sensitive adhesive composition exhibiting improved conversion as seen in ability to cut the adhesive and excellent low and ambient temperature pressure-sensitive adhesive performance. The performance of the adhesive is improved even more by additives which also benefit cuttability of tackified styrene-butadiene-styrene, styrene-butadiene, styrene-isoprene-styrene, styrene-isoprene and like copolymers as well as natural rubbers (polyisoprene) and other related elastomer polymers. The additives may be used in solvent, emulsion and hot-melt adhesives. Hot melt adhesives are especially benefitted. The preferred adhesives systems are described in detail in U.S. patent application Ser. No. 07/755,585 filed Sep. 3, 1991, and incorporated herein by reference.

As used for such adhesive, "tackifier system" consists of tackifiers include normally liquid and solid tackifiers which leave unchanged the glass transition temperature of the elastomeric block in which they are not soluble. There may also be employed plasticizer oils which lower the glass transition temperature. Tackifier systems used in the practice of the instant invention, include conventional tackifiers and plasticizer oils, and for the preferred blends of incompatible elastomers have the net effect of being preferentially soluble in the polyisoprene block so as to preferentially increase the difference between the glass transition temperature of the polyisoprene block component relative to the polybutadiene block component, with an increase (amplification) of the tangent delta of the polyisoprene peaks of the pressure-sensitive adhesive composition.

More particularly, polymers used in formulating the pressure-sensitive adhesives of this invention are based on natural and/or synthetic elastomeric polymers. Useful are AB, ABA and $(AB)_x$ block copolymers wherein x has a value of 3 or more and wherein A is a block comprising at least one monoalkenyl arene, preferably styrene, alpha methyl styrene, vinyl toluene and the like, and B is an elastomeric conjugated diene block, preferably a polybutadiene or a polyisoprene block. Preferably at least one is based on polybutadiene blocks and one other is based on polyisoprene blocks. These include, but are not limited to, homopolymers, block, random or multiarmed copolymers, and mixtures thereof. Among the useful elastomeric polymers there may be mentioned natural rubber (polyisoprene), polybutadiene, synthetic polyisoprene, random styrene-butadiene polymers, styrene-butadiene (SB) block copolymers, multiarmed and repeating (SB) copolymers, styrene-butadiene-styrene (SBS) block copolymers, styrene-isoprene (SI) block copolymers, styrene-isoprene-styrene (SIS) block copolymers, multiarmed styrene-isoprene $(SI)_x$ block copolymers, and the like. It will be understood that random copolymers may also be used and can reverse the diene preferentially tackified so long as the glass transition temperature of the polymer exhibiting the highest glass transition temperature is increased relative to the polymer of lower glass transition temperature.

Commercial elastomeric polymers used include linear SIS/SI block copolymers known as Kraton D-1107 and D-1112, SBS/SB block copolymers known as Kraton D-1101, D-1102 and DX-1300, and an $(SI)_x$ block copolymer known as Kraton D-1320X, all manufactured and sold by Shell Chemical Company, and an SB block copolymer known as Solprene 1205 manufactured and sold by Housemex, Inc. As indicated, in many of the SIS or SBS block copolymers, there are respectively present SI or SB components.

Other elastomers, such as the ethylene-propylene diene rubbers, styrene-ethylene/butylene, styrene block copolymers, styrene-ethylene/propylene-styrene block copolymers and the like, may also be used.

The weight ratio of the polybutadiene containing constituents of the mixture to the polyisoprene constituents of the mixture are such that there are provided two peaks on the DMS curve for the mixture. Generally, weight ratios range from about 0.5:1 upward. Compositions contemplated to be used in accordance with the instant invention are combined in ratio of about 0.5:1 to about 5:1, preferably from about 1:1 to about 1.5:1, and most preferably from about 1.3:1.

Tackifier additives for the polyisoprene component are preferably obtained by the polymerization of a stream of aliphatic petroleum derivatives in the form of dienes and mono-olefins containing 5 or 6 carbon atoms generally in accordance with the teachings of U.S. Pat. Nos. 3,577,398 to Pace and 3,692,756 to St. Cyr, both incorporated herein by reference. The resultant hydrocarbons range from materials which are normally liquid at room temperature to those which are normally solid at room temperature and typically contain 40% or more by weight polymerized dienes. The dienes are typically piperylene and/or isoprene. They are sold by the Chemical Division of Goodyear Tire and Rubber Company as the Wingtack family of resins with the numerical designation being the softening point, e.g., Wingtack 95 which is normally a solid resin having a softening point of about 95° C. and Wingtack 10 which is normally a liquid resin having a softening point of about 10° C.

Other normally solid tackifiers are Escorez 1310 LC manufactured by Exxon and Piccotac 95 manufactured by Hercules.

Other additives which may serve a tackifier function include hydrogenated aromatic resins wherein a very substantial portion, if not all, of the benzene rings are converted to cyclohexane rings (for example, the Regalrez family of resins manufactured by Hercules such as Regalrez 1018, 1033, 1065, 1078 and 1126, and Regalite R-100, and the Arkon family of resins fm Arakwa Chemical such as Arkon P-85, P-100, P-115 and P-125), hydrogenated polycyclic resins (typically dicyclopentadiene resins such as Escorez 5300, 5320, 5340 and 5380 manufactured by Exxon) and the like.

There can be also added rosins, rosin esters, polyterpenes and other tackifiers which are compatible to some degree with the polyisoprene and polybutadiene phases. Other additives include plasticizer oils such as Shellflex 371 manufactured by Shell and Kaydol mineral oil manufactured by Witco which are soluble in both the polyisoprene and polybutadiene phases.

The tackifier system may be present in an amount, based on the total weight of tackifier system and elastomers, of from about 50% to about 80% by weight, preferably from about 50% to about 70% by weight, more preferably from about 60% to about 70% by weight. The presently preferred ratio is about 38% by weight elastomer and about 62% by weight tackifying resin additive, the resin additive preferably being a mixture of a normally solid tackifier such as Wingtack 95 or Escorez 1310 LC and a normally liquid tackifier such as Wingtack 10 or a plasticizer oil such as Shellflex 371. Polystyrene reinforcing additives may be present but are not required.

The surfactants employed to improve cuttability of the above-mentioned adhesive systems are block copolymer surfactants preferably having hydrophilic polyethylene-oxide (PEO) blocks and hydrophobic polypropylene-oxide (PPO) blocks and are generally of the formula:

PEO—PPO—PEO, (1)

PPO—PEO—PPO, (2)

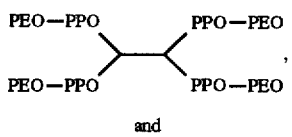

(3)

and

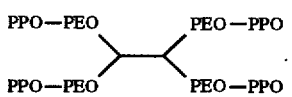

(4)

Mixtures may also be used. Surfactants of formulas (1) and (2) above are Pluronic™ surfactants, and surfactants of formulas (3) and (4) above are known as the Tetronic surfactants. Both are made by BASF. The presently preferred surfactant is Pluronic F-108 which has a molecular weight of 14600 and an HLB of greater than 24.

The surfactant may be employed in concentration of from about 1% to about 6% by weight of surfactant and elastomer, preferably from about 2% to about 5% by weight, with optimized concentration varying depending on the nature of the surfactant and/or the adhesive polymer. The HLB value should exceed 7, and preferably at least 12, and most preferably at least 24.

The surfactant may be augmented by the addition of 0 to 15% by weight of the total composition of a wax including natural waxes such as montan wax, carnauba wax, bees wax and the like, synthetic waxes such as polyethylene and polypropylene waxes, Fischer-Tropsch waxes, microcrystalline waxes and the like. It is presently preferred to employ polyethylene glycol waxes, preferably Carbowax™ 1450.

While, as will be seen, the pressure-sensitive adhesive formulations of the instant invention exhibit excellent low temperature and ambient temperature performance as well as convertability, it may be desirable to enhance elevated temperature performance. This may be accomplished by cross-linking techniques such as the use of electron beam (EB) radiation or ultraviolet (UV) radiation or chemical cross-linking or a combination of these. If employed, it is desirable that tackifying additives be substantially saturated such that all of the energy of cure goes into cross-linking of the elastomeric components of the adhesive.

The following adhesive composition is the presently preferred hot melt adhesive as used to evaluate various surfactants identified in the tables to follow, and is the control when used with no surfactant additive:

| Elastomer and tackifier system: | |
|---|---|
| Solprene 1205 | 21.2% |
| Kraton 1107 | 16.8% |
| Escorez 1310 LC | 24.0% |
| Wingtack 10 | 38.0% |
| Antioxidants: | |
| Ethyl 330 | 0.7 pph |
| Cyanox LTDP | 0.7 pph |

In the following tables a blade rating lower than 3 is regarded as representing an improvement in cuttability, with 3 being the blade rating for the adhesive alone. A blade rating of 3 or greater represents cuttability that was not improved.

In the Following Tables:
"BCS" means block copolymer surfactant
"pph" means parts by weight per 100 parts adhesive
"N/m" means Newtons per meter
"RT" means room temperature
"QS" means quick stick
"PE" means polyethylene
"CB" means recycled cardboard
"GL" means glass
"SS" means stainless steel
"HR" means hour
"DW" means dwell
"SL" means slight The following tables describe experiments which illustrate the benefits of the addition of block copolymer surfactants to pressure-sensitive adhesives:

TABLE 1

GUILLOTINE PERFORMANCE TESTING OF TETRONIC R BLOCK COPOLYMER SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST BLADE RATING* | STACK | FACESTOCK ANCHORAGE | STRINGINESS/ LEGGINESS |
|---|---|---|---|---|---|---|---|---|
| CONTROL TETRONIC R BCS | 14.6 | — | — | — | 3 | SL. CLUMPING | OK | SHORT |
| 3 pph | 19.4 | 18700 | 80 | 12–18 | 3.5 | SL. CLUMPING | OK | MEDIUM |
| 3 pph | 19.9 | 10200 | 80 | 12–18 | 2.8 | SL. CLUMPING | OK | MEDIUM |
| 3 pph | 17.4 | 7240 | 40 | 1–7 | 3.3 | SL. CLUMPING | VERY POOR | LONG |
| 3 pph | 17.9 | 5230 | 40 | 7–12 | 2.8 | SL. CLUMPING | VERY POOR | LONG |
| 3 pph | 16.6 | 3740 | 40 | 7–12 | 3 | SL. CLUMPING | VERY POOR | LONG |

*BLADE RATING — Adhesive on Guillotine Blade Description

1 - Excellent — No adhesive on blade
2 - Very Good — Adhesive only on the very edge of blade. None on the sides.
3 - Good — Adhesive beginning to stick to the sides of the blade (approximately 1/8")
4 - Fair — Adhesive beginning to stick to the sides of the blade (approximately 1/4")
5 - Poor — Adhesive approximately 1/2" on the blade
6 - Very Poor — Adhesive building higher and/or thicker with each cut.

TABLE 2

PERFORMANCE OF PLURONIC SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST BLADE RATING* | STACK | FACESTOCK ANCHORAGE | STRINGINESS/ LEGGINESS |
|---|---|---|---|---|---|---|---|---|
| (0 pph) control | 14.6 | — | — | — | 3 | SL. CLUMPING | OK | SHORT |
| BCS ADDITIVES | | | | | | | | |
| PLURONIC F-108 | | 14600 | 80 | >24 | | | | |
| 3 pph | 12.4 | | | | 3 | V. SL. CLUMPING | OK | LONG |
| 4 pph | 13.6 | | | | 2.2 | NO CLUMPING | OK | LONG |
| 5 pph | 13.8 | | | | 1.5 | NO CLUMPING | OK | LONG |
| PLURONIC R 17R8 | | 7000 | 80 | 12–18 | | | | |
| 3 pph | 18 | | | | 2 | NO CLUMPING | OK | LONG |
| 4 pph | 19 | | | | 2.5 | V. SL. CLUMPING | OK | LONG |
| 5 pph | 19.5 | | | | 1.5 | V. SL. CLUMPING | OK | LONG |
| TETRONIC 908 | | 25000 | 80 | >24 | | | | |
| 3 pph | 18.7 | | | | 2.5 | NO CLUMPING | OK | LONG |
| 4 pph | 15.4 | | | | 2.5 | NO CLUMPING | OK | MEDIUM |
| 5 pph | 19.2 | | | | 2.3 | V. SL. CLUMPING | OK | LONG |
| TETRONIC R 50R8 | | 10200 | 80 | 12–18 | | | | |
| 3 pph | 17.7 | | | | 3 | V. SL. CLUMPING | OK | LONG |
| 4 pph | 19.4 | | | | 2.7 | NO CLUMPING | OK | LONG |
| 5 pph | 19.8 | | | | 1.5 | NO CLUMPING | OK | LONG |

TABLE 3

GUILLOTINE PERFORMANCE TESTING OF BLOCK COPOLYMER SURFACTANTS AT 5 PPH LEVELS

| TEST SAMPLE | VISCOSITY @ 175° C. Pa · s | BCS AVE MW | HYDROPHILE % POLYOXY-ETHYLENE | HLB | GUILLOTINE PERFORMANCE TEST BLADE RATING* | STACK | FACESTOCK ANCHORAGE | STRINGINESS/ LEGGINESS |
|---|---|---|---|---|---|---|---|---|
| BCS (5 pph) | | | | | | | | |
| Tetronic 908 | 19.3 | 25000 | 80 | >24 | 2 | NO CLUMPING | OK | SHORT |
| Pluronic 17R4 | 18.1 | 2650 | 40 | 7–12 | 2 | NO CLUMPING | OK | MEDIUM |
| Pluronic F108 | 16.3 | 14600 | 80 | >24 | 1 | NO CLUMPING | VERY POOR | LONG |

TABLE 4

GUILLOTINE PERFORMANCE TESTING OF TETRONIC R BLOCK COPOLYMER SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST BLADE RATING* | STACK | FACESTOCK ANCHORAGE | STRINGINESS/ LEGGINESS |
|---|---|---|---|---|---|---|---|---|
| TETRONIC R BCS | | | | | | | | |
| 3 pph 90R8 | 19.4 | 18700 | 80 | 12–18 | 3.5 | SL. CLUMPING | OK | MEDIUM |
| 3 pph 50R8 | 19.9 | 10200 | 80 | 12–18 | 2.8 | SL. CLUMPING | OK | MEDIUM |
| 3 pph 90R4 | 17.4 | 7240 | 40 | 1–7 | 3.3 | SL. CLUMPING | VERY POOR | LONG |
| 3 pph 70R4 | 17.9 | 5230 | 40 | 7–12 | 2.8 | SL. CLUMPING | VERY POOR | LONG |
| 3 pph 50R4 | 16.6 | 3740 | 40 | 7–12 | 3 | SL. CLUMPING | VERY POOR | LONG |

TABLE 5

GUILLOTINE PERFORMANCE TESTING OF PLURONIC BLOCK COPOLYMER SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST | | FACESTOCK ANCHORAGE | STRINGINESS/ LEGGINESS |
|---|---|---|---|---|---|---|---|---|
| | | | | | BLADE RATING* | STACK | | |
| PLURONIC BCS | | | | | | | | |
| 3 pph F-108 | 16.8 | 14600 | 80 | >24 | 2.5 | NO CLUMPING | OK | SHORT |
| 3 pph F-88 | 13.6 | 11400 | 80 | >24 | 2.8 | NO CLUMPING | OK | SHORT |
| 3 pph F-87 | 18 | 7770 | 70 | >24 | 2.5 | CLUMPING | POOR | LONG |
| 3 pph P-85 | 19 | 4600 | 50 | 12–18 | 3.5 | CLUMPING | VERY POOR | LONG |
| 3 pph F-68 | 13 | 8400 | 80 | >24 | 2.5 | NO CLUMPING | OK | SHORT |

TABLE 6

GUILLOTINE PERFORMANCE TESTING OF PLURONIC R BLOCK COPOLYMER SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST | | FACESTOCK ANCHORAGE | STRINGINESS/ LEGGINESS |
|---|---|---|---|---|---|---|---|---|
| | | | | | BLADE RATING* | STACK | | |
| PLURONIC R BCS | | | | | | | | |
| 3 pph 25R-8 | 15.7 | 8550 | 80 | 12–18 | 2.6 | NO CLUMPING | OK | LONG |
| 3 pph 17R-8 | 13.6 | 7000 | 80 | 12–18 | 2.2 | NO CLUMPING | OK | SHORT-MEDIUM |
| 3 pph 10R-8 | 18.8 | 4550 | 80 | 18–23 | 3 | V. V. SL. CLUMPING | OK | LONG |
| 3 pph 25R-5 | 18.7 | 4250 | 50 | 7–12 | 3 | NO CLUMPING | VERY POOR | LONG |
| 3 pph 10R-5 | 15.5 | 1950 | 50 | 12–18 | 2.4 | V. V. SL. CLUMPING | VERY POOR | LONG |

TABLE 7

GUILLOTINE PERFORMANCE TESTING OF TETRONIC BLOCK COPOLYMER SURFACTANTS

| TEST SAMPLE | VISCOSITY @ 175° C. Pa · s | BCS AVE MW | HYDROPHILE % POLYOXY-ETHYLENE | HLB | GUILLOTINE PERFORMANCE TEST | | FACESTOCK ANCHORAGE | STRINGINESS/ LEGGINESS |
|---|---|---|---|---|---|---|---|---|
| | | | | | BLADE RATING* | STACK | | |
| TETRONIC BCS | | | | | | | | |
| 3 pph 707 | 16.7 | 12200 | 70 | >24 | 2.8 | NO CLUMPING | OK | SHORT |
| 3 pph 1107 | 19.9 | 15000 | 70 | 18–23 | 3 | V. SL. CLUMPING | OK | SHORT |
| 3 pph 1307 | 17.8 | 18000 | 70 | 18–23 | 3 | SL. CLUMPING | OK | MEDIUM |
| 3 pph 1508 | 18.1 | 30000 | 80 | >24 | 3.5 | CLUMPING | OK | MEDIUM |
| 3 pph 901 | 15.5 | 4700 | 10 | 1–7 | 3.5 | CLUMPING | VERY POOR | LONG |
| 3 pph 904 | 16.8 | 6700 | 40 | 12–18 | 3 | SL. CLUMPING | VERY POOR | LONG |
| 3 pph 908 | 18.7 | 25000 | 80 | >24 | 3 | SL. CLUMPING | OK | SHORT |

Tables 8, 9 and 10:

Table 8 shows compositions based on the addition of Carbowax™ 1450 to compositions of the invention while Tables 9 and 10 report the adhesive performance of such compositions, some to a control which was a solvent-based removable adhesive based on butyl rubber which had a guillotine value of 0.1875 Composition B(2) is a repeat of Composition B.

TABLE 8

|  | Composition A PPH | Composition B + B(2) PPH | Composition C PPH |
|---|---|---|---|
| KRATON RP6403 (SIS/SI) | 34 | 42 | — |
| DPX 512 (100% SIS) | — | — | 18 |
| SOLPRENE 1205 (SB) | — | — | 24 |
| ECR 143 (Tackifier) | 50 | 41 | 41 |
| PLURONIC F108 (Surfactant) | 11 | 5 | 12 |
| CARBOWAX 1450 (Wax) | 5 | 12 | 5 |
| CAMEL WITE (Opacifier) | 5 | 5 | 5 |
| IRGANOX 565 (antioxidant) | 0.3 | 0.3 | 0.3 |
| IRGAFOS 168 (antioxidant) | 0.6 | 0.6 | 0.6 |
| (GUILLOTINE) | 0.1875 | 0.1875 | 0.25 |
| BLADE SMEAR HT (inches) |  | 0.1875 (2) |  |

TABLE 9

|  | S.S. | ABS | HDPE | Glass | Appliance Enamel |
|---|---|---|---|---|---|
| 1 Day/25° C. | | | | | |
| Composition A | 1.07,p | 1.63,p | 0.82,p | 0.82,p | 0.889,p |
| Composition B | 0.992,p | 1.44,p | 0.81,p | 0.81,p | 0.77,p |
| Composition (B)2 | 0.906,p | 1.15,p1 | 0.69,p | 0.70,p1 | 0.85,p |
| Composition C | 1.005,p1 | 1.43,p1 | 0.88,p | 1.12,p1 | 0.833,p1 |
| Control | 0.426,p | 0.639,p1 | 0.398,p | 0.528,p | 0.41,p |
| 7 Day/25° C. | | | | | |
| Composition A | 1.21,p | 1.99,pt | 0.842,p | 0.956,p | 0.90,p |
| Composition B | 1.15,p | 1.59,p1 | 0.86,p | 0.97,p | 0.88,p |
| Composition C | 0.922,p | 1.32,pt | 0.59,p | 0.881,p1 | 0.942,p |
| Composition D | 1.097,p1 | 1.74,p1 | 0.82,p | 1.033,p1 | 0.925,p1 |
| Control | 0.71,p | 0.84,p1 | 0.558,p | 0.846,p | 0.718,p |
| 14 Day/25° C. | | | | | |
| Composition A | 1.272,p | 2.327,p2 | 0.915,p | 0.98,p | 0.97,p |
| Composition B | 1.174,p | 1.49,p1 | 0.86,p | 0.96,p | 0.95,p |
| Composition C | 0.957,p | 1.44,pt | 0.68,p | 1.0,p | 1.10,p |
| Composition D | 1.11,p1 | 1.71,pt | 0.913,p | 1.04,p1 | 0.87,p1 |
| Control | 0.85,p | 0.90,p1 | 0.7,p | 0.917,p | 0.822,p |

Facestock: 011-24/P-32 Coat Weight: 21 ± gsm
p1: very light shade
p2: light staining
p3: heavy staining
pt: paper tore

TABLE 10

|  | S.S. | ABS | HDPE | Glass | Appliance Enamel |
|---|---|---|---|---|---|
| 1 Day/50° C. | | | | | |
| Composition A | 1.05,p1 | 2.16,F | 0.89,p | 0.87,p1 | 0.93,p |
| Composition B | 1.03,p1 | 2.34,F | 0.933,p | 0.95,p1 | 0.81,p1 |
| Composition C | 0.85,p1 | 1.69,p2 | 0.78,p | 0.89,p1 | 0.65,p1 |
| Composition D | 1.13,p2 | 2.20,p3 | 0.912,p | 0.91,p1 | 0.99,p1 |
| Control | 0.845,p1 | 0.89,p2 | 0.77,p1 | 0.941,p | 0.81,p |
| 14 Day/50° C. | | | | | |
| Composition A | 1.09,p1 | 2.049,p3 | 0.84,p | 0.96,p1 | 1.101,p |
| Composition B | 1.19,p1 | 1.893,F | 0.904,p | 1.02,p1 | 1.207,p1 |
| Composition C | 1.81,pt | 1.625,p3 | 0.77,p1 | 1.16,p1 | 1.10,p2 |
| Composition D | 1.102,p2 | 2.27,p3 | 0.90,p | 1.02,p1 | 1.06,p1 |
| Control | 0.894,p | 1.01,p2 | 1.10,p1 | 0.911,p | 0.791,p |

TABLE 10-continued

|  | S.S. | ABS | HDPE | Glass | Appliance Enamel |
|---|---|---|---|---|---|
| 28 Day/50° C. | | | | | |
| Composition A | 1.81,p3 | 1.125,p3 | tore | 2.0,p3 | 0.82,p3 |
| Composition B | 0.82,p3 | 1.55,p3 | 1.23,p3 | 1.08,p3 | 1.13,p3 |
| Composition C | 1.44,p3 | NA | 0.75,p2 | 1.11,p3 | 1.38,p3 |
| Composition D | 1.55,p3 | 1.73,pt | 1.363,pt | 1.42,p3 | 1.27,p3 |
| Control | 1.03,p | 1.33,p2 | 2.14,pt | 1.11,p | 1.048,p |

Facestock: 011-24/P-32 Coat Weight: 21 ± gsm
p1: very light shade
p2: light staining
p3: heavy staining
pt: paper tore

What is claimed is:

1. A pressure-sensitive adhesive exhibiting improved cuttability as an element of a pressure-sensitive label construction which pressure-sensitive adhesive comprises an elastomeric hot melt pressure-sensitive adhesive formed of a first elastomer providing a first polymerized diene component exhibiting a first glass transition temperature and a second elastomer providing a second polymerized diene component exhibiting a second glass transition temperature greater than the first glass transition temperature, and a tackifying additive comprising at least one tackifier which is preferentially soluble in the second elastomer and present in an amount sufficient to cause the dynamic mechanical spectrum of the mixture of immiscible elastomers to exhibit an increase in the second glass transition temperature and an increase in the difference between the first and second glass transition temperatures and an increase in the value of tangent delta determined at the second glass transition temperature, and in which the elastomers are present in an amount of from about 20 to 50% by weight of elastomers and tackifying additive, said pressure sensitive adhesive containing a surfactant having an HLB value greater than 7 comprised of at least one hydrophilic polyethylene oxide block and at least one hydrophobic propropylene oxide block and from 0 to about 15% by weight of the composition of a compatible wax.

2. A pressure-sensitive adhesive as claimed in claim 1 in which the surfactant is selected from the group consisting of compounds of the formula:

PEO—PPO—PEO,

PPO—PEO—PPO,

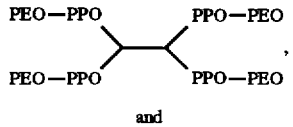

and

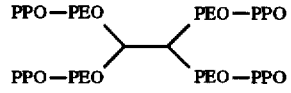

and mixtures thereof wherein PEO means a polyethyleneoxide block and PPO means a polypropylene-oxide block, said surfactant having an HLB value of at least about 7.

3. A pressure-sensitive adhesive as claimed in claim 1 in which the surfactant is present in an amount of from about 1 to about 6% by weight of the surfactant and elastomeric pressure-sensitive adhesive.

4. A pressure-sensitive adhesive as claimed in claim 2 in which the surfactant is present in an amount of from about 1 to about 6% by weight of the surfactant and elastomeric pressure-sensitive adhesive.

5. A pressure-sensitive adhesive as claimed in claim 1 in which the wax is a polyethylene glycol wax.

6. A pressure-sensitive adhesive as claimed claim 2 in which the wax is a polyethylene glycol wax.

7. A pressure-sensitive adhesive as claimed in claim 1 in which the first elastomer is selected from the group consisting of polybutadiene, styrene-butadiene block copolymers, styrene-butadiene-styrene block copolymers, styrene-butadiene multiarmed block copolymers and mixtures thereof, the second elastomer is selected from the group consisting of natural rubber, synthetic polyisoprene, styrene-isoprene-styrene block copolymers, styrene-isoprene block copolymers, styrene-isoprene multiarmed block copolymers and mixtures thereof, and the tackifying system is preferentially soluble in the polyisoprene component and selected from the group comprising normally solid polymerized $C_5$ or $C_6$ diene resins, normally solid hydrogenated aromatic hydrocarbons, normally solid saturated cycloaliphatic hydrocarbons and mixtures thereof, alone or in combination with a normally liquid polymerized $C_5$ or $C_6$ diene tackifier, a plasticizing oil and mixtures thereof.

8. A pressure-sensitive adhesive as claimed in claim 1 in which the first elastomer is selected from the group consisting of polybutadiene, styrene-butadiene block copolymers, styrene-butadiene-styrene block copolymers, styrene-butadiene multiarmed block copolymers and mixtures thereof, the second elastomer is selected from the group consisting of natural rubber, synthetic polyisoprene, styrene-isoprene-styrene block copolymers, styrene-isoprene block copolymers, styrene-isoprene multiarmed block copolymers and mixtures thereof, and the tackifying system is preferentially soluble in the polyisoprene component and selected from the group comprising normally solid polymerized $C_5$ or $C_6$ diene resins, normally solid hydrogenated aromatic hydrocarbons, normally solid saturated cycloaliphatic hydrocarbons and mixtures thereof, alone or in combination with a normally liquid polymerized $C_5$ or $C_6$ diene tackifier, a plasticizing oil and mixtures thereof.

9. A pressure-sensitive adhesive as claimed in claim 1 in which the weight ratio of the first elastomer to the second elastomer is about 0.5 to about 5.

10. A pressure-sensitive adhesive as claimed in claim 1 in which the weight ratio of the first elastomer to the second elastomer is about 0.5 to about 1.

11. A pressure-sensitive adhesive as claimed in claim 8 in which the weight ratio of the first elastomer to the second elastomer is about 0.5 to about 5.

12. A pressure-sensitive adhesive as claimed in claim 1 in which the weight ratio of the first elastomer to the second elastomer is at about 1.0 to about 1.5.

13. A pressure-sensitive adhesive as claimed in claim 8 in which the weight ratio of the first elastomer to the second elastomer is about 1.0 to about 1.5.

14. A pressure-sensitive adhesive as claimed in claim 1 in which a first and second elastomer are present in an amount of from about 30% to 50% by weight based on the total weight of the mixture and tackifying system.

15. A pressure-sensitive adhesive as claimed in claim 8 in which a first and second elastomer are present in an amount of from about 30% to 50% by weight based on the total weight of the mixture and tackifying system.

16. A pressure-sensitive adhesive as claimed in claim 1 in which the weight ratio of the first elastomer to the second elastomer is about 1.3:1.

17. A pressure-sensitive adhesive as claimed in claim 1 in which the weight ratio of the first elastomer to the second elastomer is about 0.5:1 to about 2.5:1.

18. A pressure-sensitive adhesive as claimed in claim 2 in which the weight ratio of the first elastomer to the second elastomer is about 0.5:1 to about 1.5:1.

19. A pressure-sensitive adhesive as claimed in claim 16 in which the weight ratio of the first elastomer to the second elastomer is about 0.5:1 to about 1.5:1.

20. A pressure-sensitive adhesive as claimed in claim 1 in which the surfactant has an HLB value of at least 12.

21. A pressure-sensitive adhesive as claimed in claim 2 in which the surfactant has an HLB value of at least 12.

22. A pressure-sensitive adhesive as claimed in claim 1 in which the surfactant has an HLB value greater than 24.

23. A pressure-sensitive adhesive as claimed in claim 2 in which the surfactant has an HLB value greater than 24.

24. A pressure-sensitive adhesive exhibiting improved cuttability as an element of a pressure-sensitive label construction which pressure-sensitive adhesive comprises an elastomeric hot melt pressure-sensitive adhesive formed of a first elastomer providing a first polymerized diene component which is a polybutadiene, said first elastomer exhibiting a first glass transition temperature and a second elastomer providing a second polymerized diene which is a polyisoprene, said second elastomer component exhibiting a second glass transition temperature greater than the first glass transition temperature, and a tackifying additive comprising at least one tackifier which is preferentially soluble in the second elastomer and present in an amount sufficient to cause the dynamic mechanical spectrum of the mixture of immiscible elastomers to exhibit an increase in the second glass transition temperature and an increase in the difference between the first and second glass transition temperatures and an increase in the value of tangent delta determined at the second glass transition temperature, and in which the elastomers are present in an amount of from about 20 to 50% by weight of elastomers and tackifying additive, said pressure sensitive adhesive containing a surfactant having an HLB value greater than 7 and comprised of at least one hydrophilic polyethylene oxide block and at least one hydrophobic propropylene oxide block and from 0 to about 15% by weight of the composition of a compatible wax.

25. A pressure-sensitive adhesive as claimed in claim 24 in which the surfactant has an HLB value of at least 12.

* * * * *